United States Patent [19]
Sato et al.

[11] Patent Number: 5,535,716
[45] Date of Patent: Jul. 16, 1996

[54] COMPRESSION IGNITION TYPE GASOLINE ENGINE INJECTING FUEL INSIDE INTAKE PORT DURING EXHAUST STROKE

[75] Inventors: Yasuo Sato, Susono; Taro Aoyama; Yoshiaki Hattori, both of Nagoya, all of Japan

[73] Assignees: Toyota Jidosha Kabushiki Kaisha, Toyota; Kabushiki Kaisha Toyota Chuo Kenkyusho, Aichi-Gun, both of Japan

[21] Appl. No.: 456,983

[22] Filed: May 31, 1995

[30] Foreign Application Priority Data

Jun. 7, 1994 [JP] Japan .................................. 6-150487

[51] Int. Cl.$^6$ .................................................. F02F 3/26
[52] U.S. Cl. ............................................ 123/279; 123/27 R
[58] Field of Search ........................... 123/279, 298, 123/365, 27 R, 276 E

[56] References Cited

U.S. PATENT DOCUMENTS

| | | | |
|---|---|---|---|
| 2,986,129 | 5/1961 | Biabuad | 123/298 |
| 4,401,072 | 8/1983 | Ito et al. | 123/279 |
| 4,520,765 | 6/1985 | Gerace | 123/27 R |
| 4,635,590 | 1/1987 | Gerace | 123/27 R |

FOREIGN PATENT DOCUMENTS

| | | | |
|---|---|---|---|
| 2450953 | 12/1975 | European Pat. Off. | 123/279 |
| 3032656 | 4/1982 | European Pat. Off. | 123/279 |
| 58-53169 | 11/1983 | Japan | 123/279 |
| 62-41940 | 2/1987 | Japan | 123/279 |
| 5-33708 | 2/1993 | Japan | 123/279 |

OTHER PUBLICATIONS

Motortechnische Zeitschrift, vol. 28, No. 11, Nov. 1, 1967–Nov. 30, 1967, Stuttgart, pp. 475–481.
G. Baumann 'Eine Elktronisch Gesteuerte Kraftstoffeinspritzung Fur Ottomoren', p. 475, paragraph 6, FIGS. 1, 2.

"Combustion Characteristics of Multiple Spark Ignition Engine", Kunii et al., 17th Automobile Technical Congress, 1979, pp. 40–46.
"A Study of Combustion in a Direct Injected Gasoline Engine", Sato et al., Automobile Technical Congress, vol. 25, No. 1, Jan. 1994.
"Effect of Flame Propagation Direction on SI Engine Combustion and Exhaust Emissions", Yamamoto et al., Automobile Technical Congress, vol. 1, 1990–10, pp. 1197–1210.
"Development of a New Generation Lean Burn Engine", Harada et al., Automobile Technical Congress, vol. 12, 1992–10, pp. 69–72.
"Effect of Mixture Heterogeneity on the Formation of Oxides of Nitrogen in Engine Combustion", Ikegami et al., Japanese Society of Mechanical Engineering No. 924–5, pp. 145–147.
"A Study on Gasoline Engine Combustion by Observation of Intermediate Reactive Products during Combustion", Noguchi et al. SAE Paper 790840.
"Homogeneous–Charge Compression–Ignition (HCCI) Engines", R. H. Thring, SAE Paper 892068.
"VW's Gasoline Direct Injection (GDI) Research Engine", Schäpertöns et al., SAE Paper 910054.

*Primary Examiner*—Raymond A. Nelli
*Attorney, Agent, or Firm*—Kenyon & Kenyon

[57] ABSTRACT

There is provided a compression ignition type gasoline engine operable under a stable lean burn condition with a high compression ratio, and which has a simple construction without using a pre-heating system for an air-fuel mixture. An intake port communicates with a combustion chamber via an opening. The opening is closed by an intake valve. A fuel injection valve is provided in the intake port so as to inject an amount of gasoline inside the intake port within a duration in which the opening is substantially closed by the intake valve. Heat is generated in the mixture in the combustion chamber by means of a high compression ratio so that the mixture is self-ignited only by heat generated by compression. The compression ratio ranges from about 14 to about 20.

8 Claims, 6 Drawing Sheets

COMPRESSION IGNITION TYPE GASOLINE ENGINE INJECTING FUEL INSIDE INTAKE PORT DURING EXHAUST STROKE

BACKGROUND OF THE INVENTION (1) Field of the Invention

The present invention generally relates to gasoline engines and, more particularly, to a compression ignition type gasoline engine in which gasoline is injected into an intake port.

Diesel engines have an advantage over gasoline engines in their specific fuel consumption because they do not have a throttle on their intake line and are capable of achieving a lean burn condition by means of compression ignition. However, diesel fuel in the diesel engine is compression-ignited by being stratified and, thus, emission control cannot be as good as that obtained by gasoline engines. More specifically, exhaust gas of diesel engines inevitably contains soot which prevents use of a catalytic converter. Accordingly, diesel engines must control emissions mainly by improving their combustion conditions.

On the other hand, although the gasoline engines exhaust a relatively high level of emissions, they can achieve low-level emissions for the whole exhaust system by having an emission control system such as a three-way catalytic converter. This is because the gasoline engines exhaust less soot as compared to the diesel engines and, thus, the catalytic converter can be more easily and conveniently used with gasoline engines than the diesel engines. However, gasoline engines have a relatively high specific fuel consumption due to a throttle which makes difficulty in a lean burn operation and due to their low compression ratio.

In order to improve the above-mentioned disadvantages of the gasoline engines, a lean burn gasoline engine is suggested which can reduce pumping loss and increase a ratio of specific heats of working gas fuel. However, a range of an equivalence ratio for achieving a stable combustion in the lean burn gasoline engine is not as wide as that of the diesel engines and, thus, a high efficiency over an entire operating range cannot be achieved.

Therefore, it is desired to develop a gasoline engine which has a specific fuel consumption as good as that of the diesel engines while maintaining good emission control.

(2) Description of the Related Art

Japanese Laid-Open Patent Application No. 62-41940 discloses a high compression ratio engine using gasoline and diesel fuel. In this engine, after the air-gasoline mixture is introduced and compressed in a cylinder, diesel fuel is injected in the cylinder near the top dead center position of a piston. The diesel fuel is self-ignited, and then the gasoline in the mixture is ignited. In this engine, the injection of the diesel fuel is used as an ignition means instead of the spark of a spark plug. This method has a disadvantage in that construction of the engine is complex and manufacturing cost is high due to a diesel fuel injection system being added to the gasoline engine.

Japanese Patent Publication No. 58-53169 discloses a 4-cycle gasoline engine having a pre-heating system which heats an air-fuel mixture, before it enters a combustion chamber, by using heat from exhaust gas. Because the air-fuel mixture is sufficiently heated before entering the combustion chamber, the fuel can be burned by means of compression ignition under a normal compression ratio which is used for a normal gasoline engine. Use of a compression ratio of 7 is described in this publication. The pre-heating system is achieved by leading exhaust gas around an intake line. Thus construction of the engine is complex and freedom of design of the intake line is limited.

Japanese Laid-Open Patent Application No. 5-33708 discloses an alcohol engine having a fuel injection nozzle in an intake port. When a small amount of alcohol is injected, the alcohol is injected inside the intake port during an exhaust stroke so that the injected alcohol is sufficiently evaporated and mixed with air before entering a combustion chamber so as to help ignition by a spark plug. Since this engine is a spark ignition type engine using a low compression ratio, this engine has the same problem as that disclosed in the above-mentioned Japanese Patent Publication No. 58-53169.

SUMMARY OF THE INVENTION

It is a general object of the present invention to provide an improved and useful gasoline engine in which the above-mentioned disadvantages are eliminated.

A more specific object of the present invention is to provide a compression ignition type gasoline engine which is operable under a stable lean burn condition with a high compression ratio.

Another object of the present invention is to provide a compression ignition type gasoline engine which has a simple construction without using a pre-heating system for an air-fuel mixture.

In order to achieve the above-mentioned objects, there is provided according to the present invention a compression ignition type gasoline engine comprising:

a combustion chamber in which a mixture of air and gasoline is combusted by compression ignition;

an intake port communicating with the combustion chamber via an opening so that air is suctioned into the combustion chamber through the intake port and the opening, the opening being closed by an intake valve; and a fuel injection valve provided in the intake port so as to inject gasoline inside the intake port, the fuel injection valve injecting the gasoline within a duration in which the opening is substantially closed by the intake valve, the mixture is heated in the combustion chamber by a high compression ratio of the engine and the mixture is self-ignited by heat generated only by compression.

According to the present invention, since gasoline is injected inside the intake port a considerable amount of time before the intake valve is open, the mixture of air and gasoline in the intake port is sufficiently heated before entering the combustion chamber. Accordingly, the mixture can be easily ignited by means of compression ignition performed at high pressure. Additionally, since the gasoline injected in the intake port is completely evaporated before entering the combustion chamber, reliable compression ignition can be achieved.

Other objects, features and advantages of the present invention will become more apparent from the following detailed description when read in conjunction with the accompanying drawings.

DETAILED DESCRIPTION OF THE PREFERRED EMBODIMENT

Figure 1:
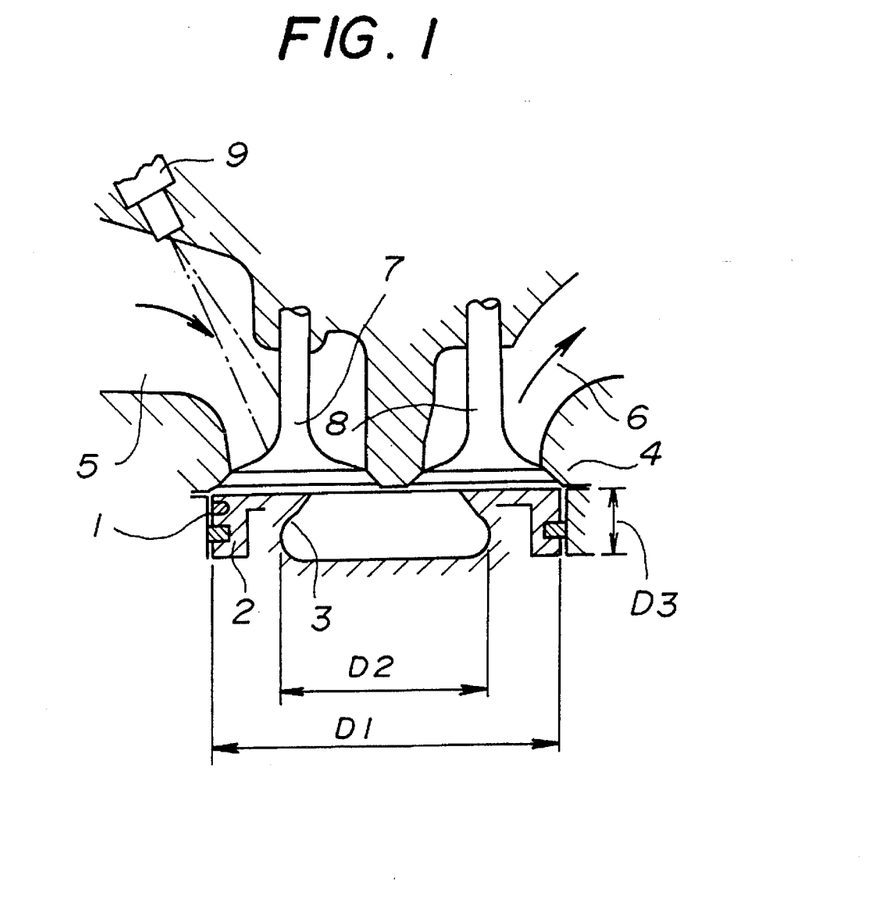
FIG. 1 is a cross-sectional view of a part of a first embodiment of a compression ignition type gasoline engine according to the present invention.
Figure 2:
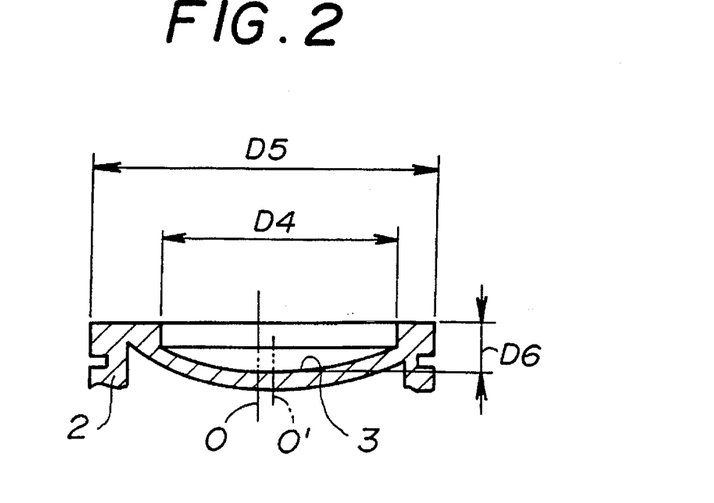
FIG. 2 is a cross-sectional view of a variation of a recess formed in a piston shown in FIG. 1.
Figure 3:
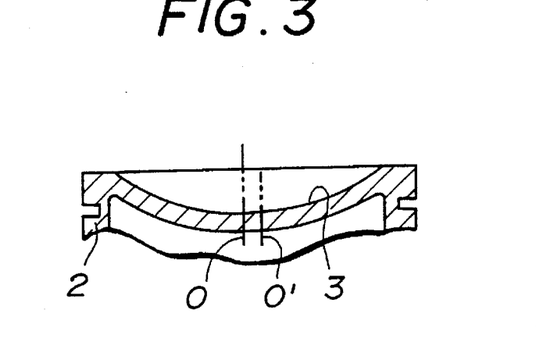
FIG. 3 is a cross-sectional view of another variation of the recess formed in the piston shown in FIG. 1.
Figure 4:
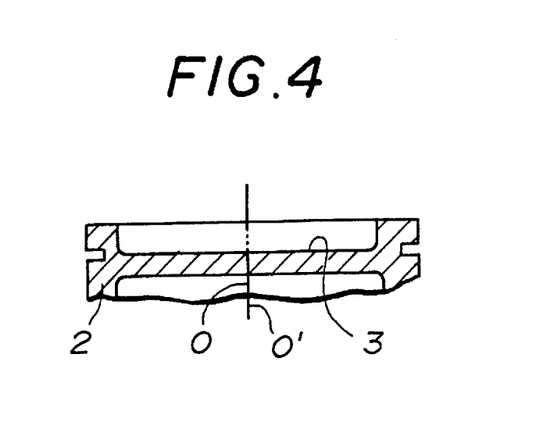
FIG. 4 is a cross-sectional view of another variation of the recess formed in the piston shown in FIG. 1.
Figure 5:
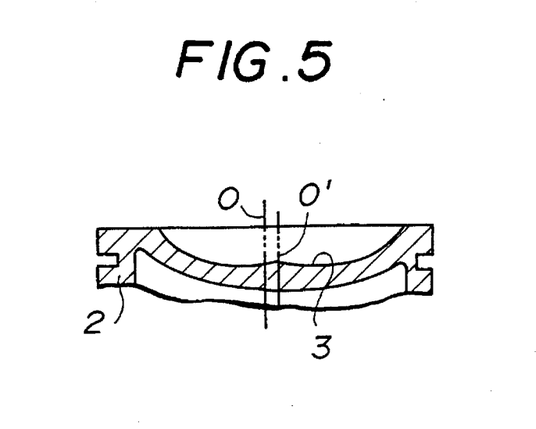
FIG. 5 is a cross-sectional view of another variation of the recess formed in the piston shown in FIG. 1.

A description will now be given, with reference to FIG. 1, of an embodiment of a compression ignition type gasoline engine according to the present invention. FIG. 1 is a cross-sectional view of a part of the engine.

In FIG. 1, a piston 2 reciprocally moves inside a cylinder 1. The piston 2 has a reentrant type recess 3 on the flat top surface thereof. A cylinder head 4 is provided on the cylinder 1. The cylinder head 4 has an intake port 5 and an exhaust port 6. Intake air flows into the cylinder 1 via the intake port 5. Exhaust gas is discharged from the cylinder 1 via the exhaust port 6. The opening of the intake port is opened and closed by an intake valve 7. The opening of the exhaust port 6 is opened and closed by an exhaust valve 8. The combustion chamber is defined by the cylinder 1, the piston 2 and the cylinder head 4.

The recess 3 formed in the piston 2 is a main part of a combustion chamber. The opening of the recess 3 is smaller than the bottom surface thereof so that a throat is formed at the opening of the recess 3. The center axis of the recess 3 matches the longitudinal axis of the piston 2. The maximum diameter D2 of the recess 3 is greater than one-half of a diameter D1 of the piston 2. Specifically, the diameter D1 of the piston 2 is 102 mm while the diameter D2 of the recess 3 is 60 mm. Additionally, the depth D3 of the recess 3 is less than one-third of the diameter D2 of the recess 3. Specifically, the depth D3 is 19 mm.

An electromagnetically operated fuel injection valve 9, part of the electronic fuel injection (EFI) system, is provided in the cylinder head 4. An injection nozzle of the valve 9 is directed inwardly toward the intake port 5. An extension of the longitudinal axis of the valve 9, corresponding to the direction of fuel injection, intersects with the longitudinal axis of the intake valve 7. The valve 9 intermittently injects an amount of gasoline inwardly toward the intake port 5 at a low pressure ranging from 0.15 MPa to 1 MPa, preferably at 0.3 MPa.

Injection of the gasoline is performed during a predetermined period. The predetermined period is from 10 degrees of crank angle before the intake valve 7 is closed to 110 degrees of crank angle before the intake valve 7 is opened. By injecting the gasoline during the above-mentioned predetermined period, it takes a considerable time period before the gasoline injected inside the intake port 5 is suctioned or drawn into the cylinder 1. Accordingly, the gasoline inside the inlet port 5 is completely evaporated and mixed with air before the mixture of air and the evaporated gasoline enters the cylinder 1. Accordingly, a completely premixed air-fuel mixture is produced when the next suction stroke of the piston is started. It should be noted that although injection of gasoline is started before the intake valve is closed, gasoline injected at 10 degrees of crank angle before the intake valve is closed does not immediately flow into the cylinder. Instead, it is suctioned into the cylinder 1 in the next suction stroke.

If gasoline is injected when the intake valve 7 is open for a suction stroke of the piston as is in the conventional engine, a completely premixed mixture cannot be produced. As a result, output power is decreased and specific fuel consumption is increased. Also, incomplete combustion products, such as HC and CO, are generated in the emissions. However, a compression ignition type gasoline engine according to the present invention has a better total specific fuel consumption, and greatly reduces $NO_x$ in emissions.

Additionally, since the only purpose of the injection of gasoline in the present invention is to supply a predetermined amount of gasoline inside the intake port 5, the injection does not require a high pressure, such as a pressure of 20 MPa, because it is not necessary to produce a mixture by energy of the injection pulse. Accordingly, a simple fuel injection valve can be used in the gasoline engine according to the present invention. Contrary to fuel injection performed in the conventional engine, a coarse mist produced due to low pressure of the injection is even preferable because the mist is attached on an inner surface of the intake port 5. This condition promotes evaporation of the gasoline.

The above-mentioned gasoline engine is operated under a high compression ratio which ranges from about 14 to about 20. By using a compression ratio ranging from about 14 to about 20, the mixture suctioned in the combustion chamber generates sufficient heat to be self-ignited. Preferably, the compression ratio is about 15 to about 19 so as to prevent engine knock. Most preferably, the compression ratio is 17.5. By using a high compression ratio of 17.5, a reliable compression ignition of gasoline in the combustion chamber is ensured, and generation of knocking is prevented. This is because a completely premixed mixture is combusted by means of combustion ignition under a high compression ratio, resulting in a super lean burn. Accordingly, undesired emissions, in particular $NO_x$, are greatly reduced. Additionally, a stable combustion range is expanded and, thus, a qualitative control of output power can be performed. Further, since the engine according to the present invention does not have a throttle for the intake air, an intake pressure loss is greatly reduced to a level which is substantially the same as that of a direct fuel injection type diesel engine and, thus, specific fuel consumption is further improved with respect to engine cycle theory.

Additionally, the recess 3 formed in the piston 2, which serves as a main part of the combustion chamber, is not limited to the configuration shown in FIG. 1. Variations of the recess 3 are shown in FIGS. 2 to 5. The recess 3 shown in FIG. 2 has a open chamber shape which does not have the throat at an opening thereto. Additionally, the center axis O' of the recess 3 is displaced from the center axis O of the piston 2. Specifically, an inner diameter D4 of the recess 3 is 70 mm while an outer diameter D5 of the piston is 102 mm, and a depth D6 is 14 mm. The recess 3 shown in FIG. 3 does not have a cylindrical portion at the opening as compared to the recess 3 shown in FIG. 2. The recess 3 shown in FIG. 4 has a flat bottom surface, and the center axis O' of the recess is the same as the center axis of the piston 2. The recess 3 shown in FIG. 5 has a small protrusion at the center of the bottom surface.

Performance of a compression ignition type gasoline engine according to the present invention was compared with that of a direct fuel injection type diesel engine. The direct injection type diesel engine is considered to have the lowest specific fuel consumption among conventional internal combustion engines in practical use. The comparison experiments were performed by using a compression ignition type gasoline engine (hereinafter referred to as the gasoline engine) having a single cylinder and a direct fuel injection type diesel engine (hereinafter referred to as the diesel engine) having a single cylinder. Both of the engines had a cylinder bore of 102 mm and a piston stroke of 112 mm, and the compression ratio was 17.5.

Diesel fuel was used for the diesel engine. The diesel fuel was injected directly inside a combustion chamber at a pressure of up to 20 MPa by using a diesel injection valve during the latter half of the compression stroke. Gasoline was used for the gasoline engine according to the present invention. The gasoline was injected inside an intake port at a pressure of up to 0.3 MPa while the intake valve Was closed. The gasoline was self-ignited by means of compression ignition due to the high compression ratio used in engines like a diesel engine. Accordingly, the gasoline engine according to the present invention does not have a spark plug and a throttle for intake air.

Experiments were performed by fixing engine speed of both of the gasoline and diesel engines at 1,000 rpm. The results of the experiments are discussed below with reference to FIGS. 6 to 11.

(1) A stable combustion condition by compression self-ignition was obtained for the engine according to the present invention at an air-fuel ratio equal to or less than 57.

Figure 6:
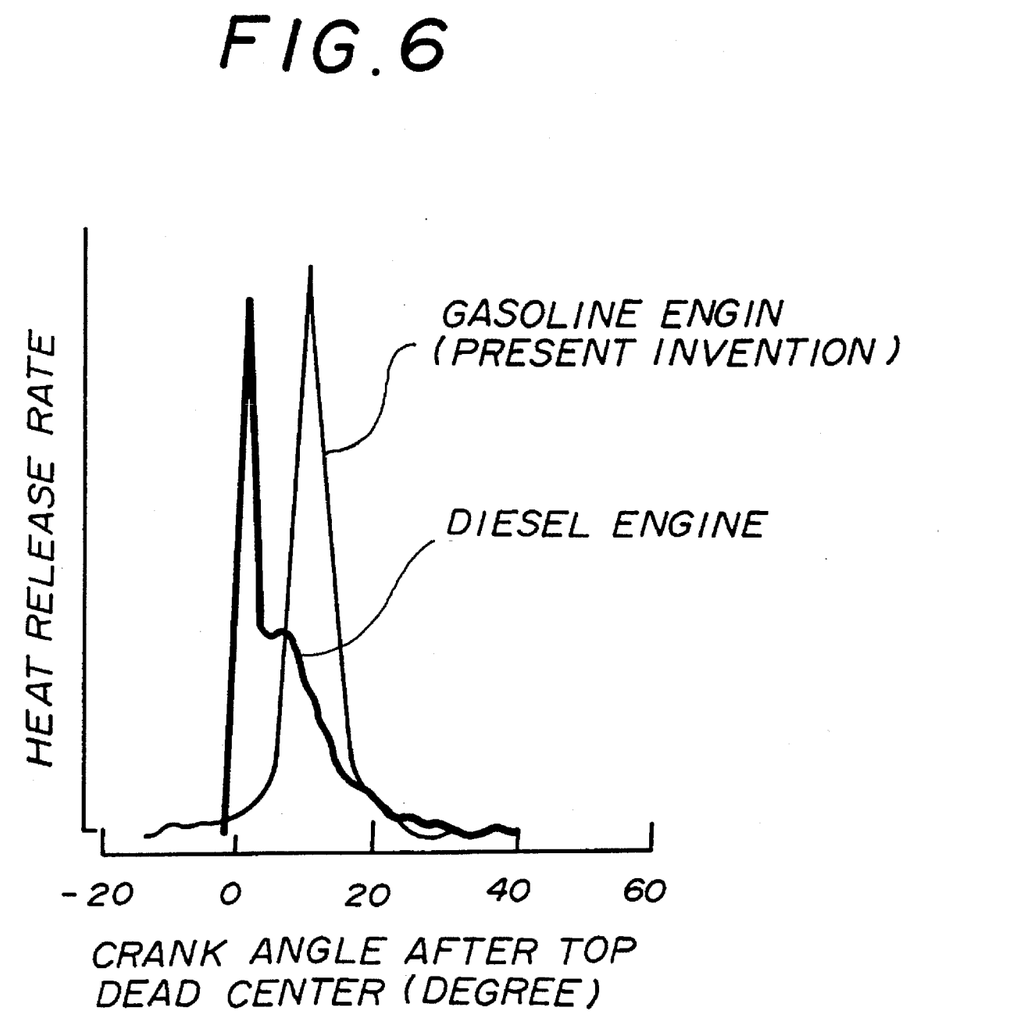
FIG. 6 is a graph showing heat release rates obtained by a gasoline engine according to the present invention and a diesel engine.
Figure 7:
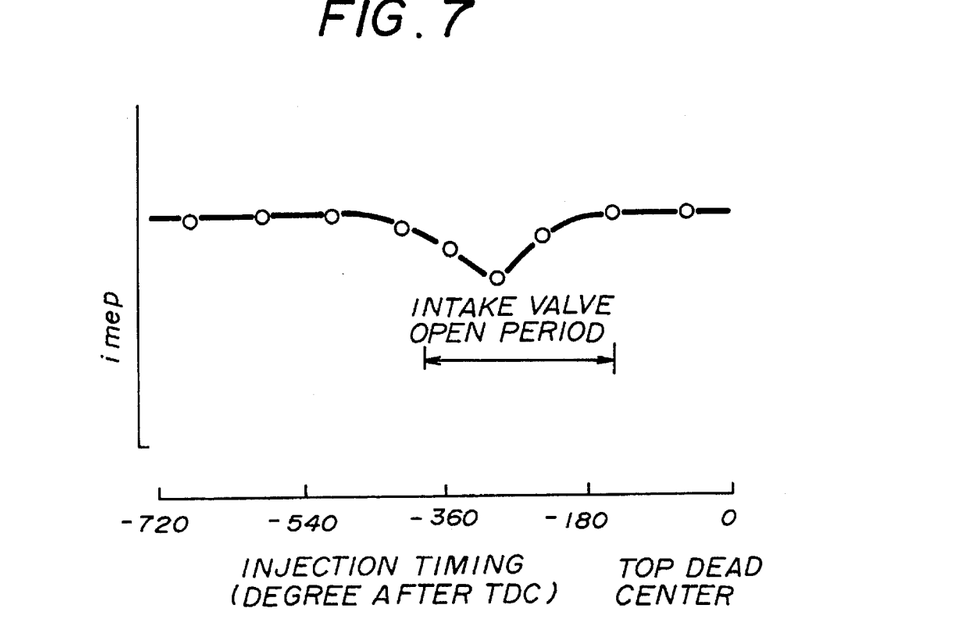
FIG. 7 is a graph of an indicated mean effective pressure of a gasoline engine according to the present invention, relative to injection timing.
Figure 8:
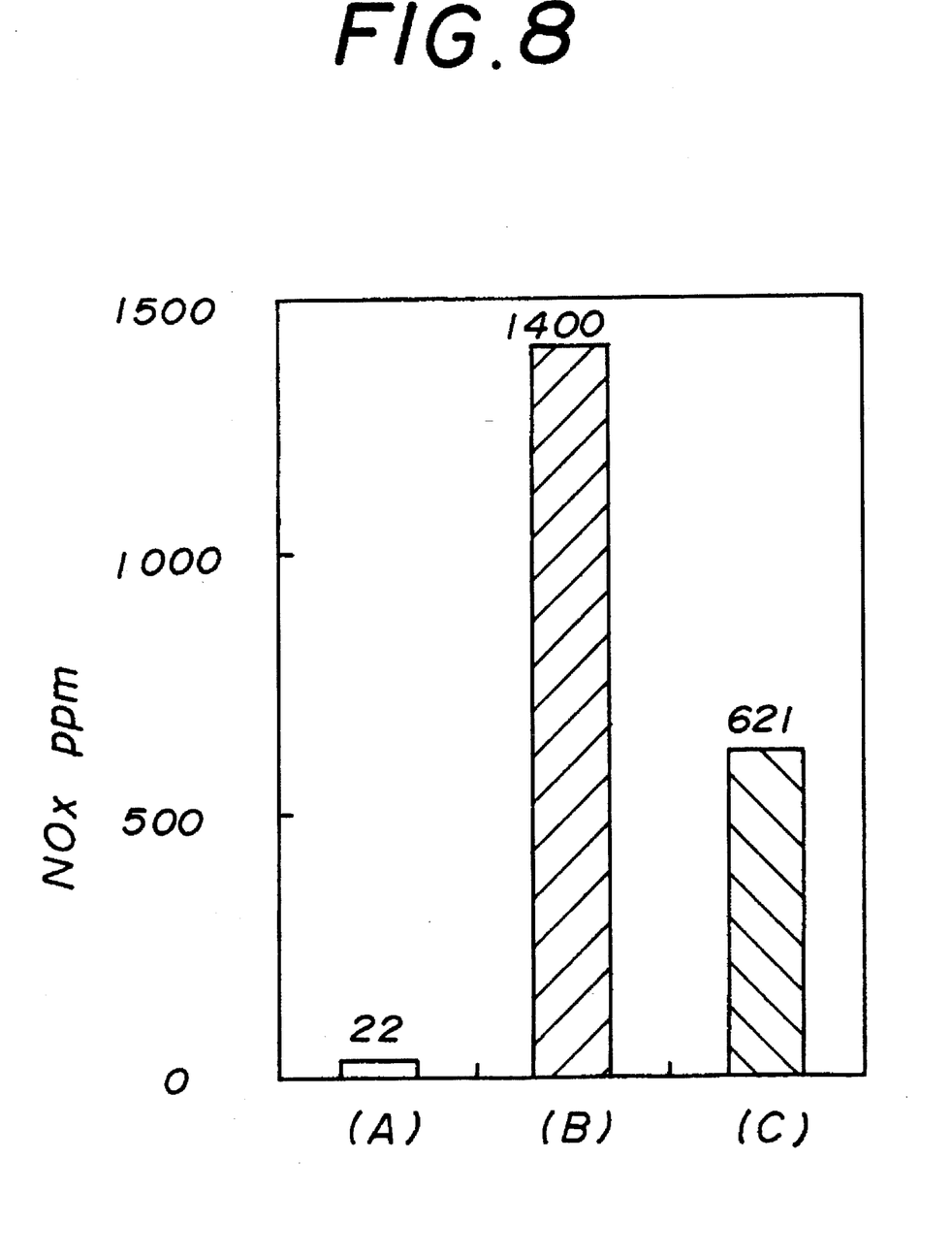
FIG. 8 is a graph showing the amount of $NO_x$ produced by a gasoline engine according to the present invention and that produced by a diesel engine.

(2) A diagram of the heat release rate was obtained for both of the gasoline engine and the diesel engine. As shown in FIG. 6, the diagram of the diesel engine showed a combustion process having a premixed combustion process and a diffusion combustion process, while that of the gasoline engine according to the present invention showed only a premixed combustion process which is similar to that of conventional gasoline engines. In FIG. 6, relatively straight portions indicate that premixed combustion is performed, and a curved portion indicates that diffusion combustion is performed.

(3) Values of an indicated mean effective pressure (imep shown in FIG. 7) and values of an indicated specific fuel consumption, which were obtained when the gasoline was injected during a period excluding a period in which an intake valve is open, were the same as that obtained by the diesel engine.

Figure 9:
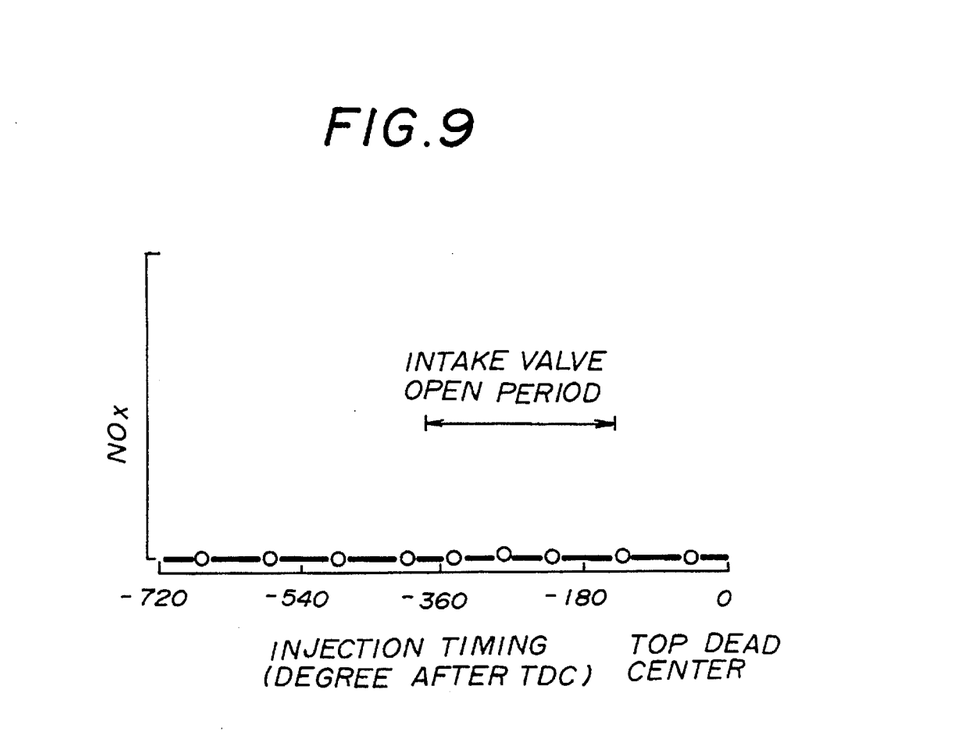
FIG. 9 is a graph of $NO_x$ emission produced by a gasoline engine according to the present invention, relative to injection timing.
Figure 10:
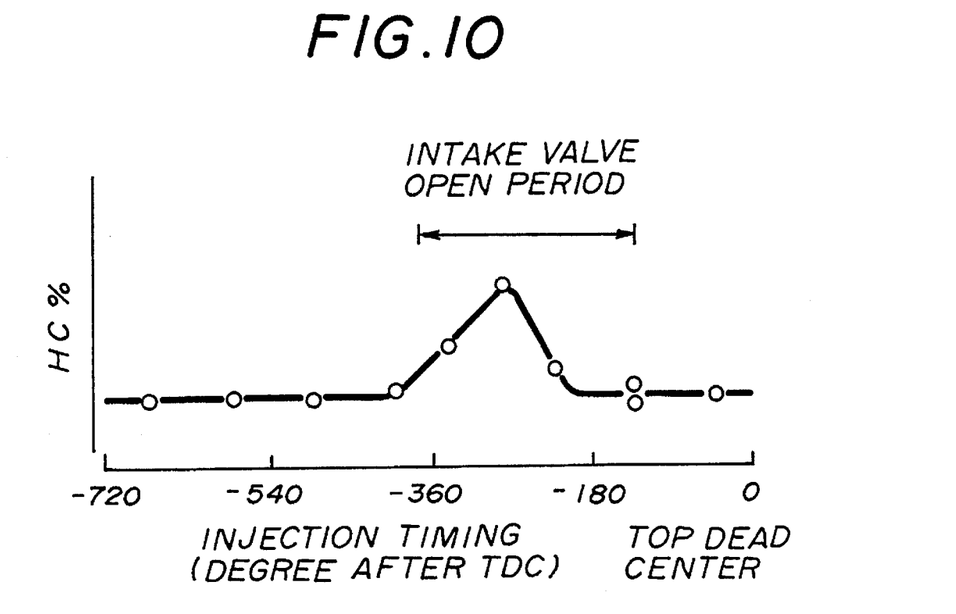
FIG. 10 is a graph of HC emission produced by a gasoline engine according to the present invention, relative to injection timing.
Figure 11:
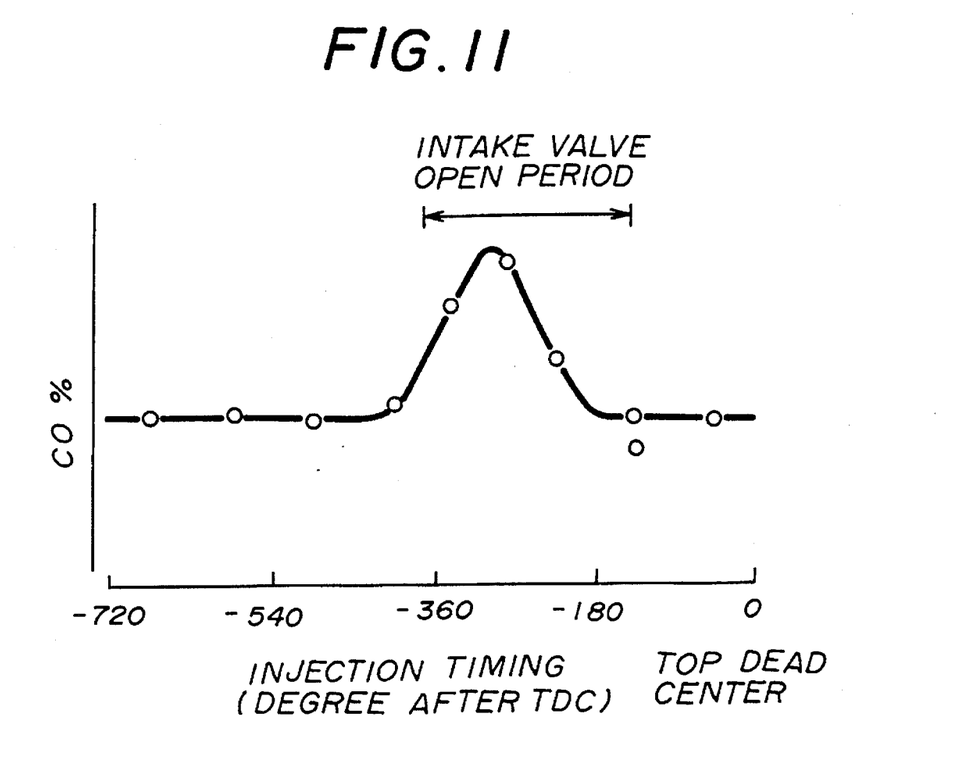
FIG. 11 is a graph of CO emission produced by a gasoline engine according to the present invention, relative to injection timing.

(4) The amount of $NO_x$ (FIG. 8) produced by the gasoline engine was about one-thirtieth of that produced by the diesel engine. In the graph shown in FIG. 8, (A) indicates the amount of $NO_x$ produced by the gasoline engine and (C) indicates that produced by the diesel engine. (B) of the graph indicates the amount of $NO_x$ produced by a gasoline engine in which gasoline is injected directly into a cylinder. The $NO_x$ emission is maintained at a constant low level as shown in FIG. 9. Thus, the gasoline engine according to the present invention achieves a low level specific fuel consumption the same as that of the direct fuel injection diesel engine while maintaining a low $NO_x$ emission level.

(5) The concentration of HC emissions (FIG. 10) was sharply increased when gasoline was injected while the intake valve was open. The concentration of HC emissions was maintained at a constant low level when the amount of gasoline was injected during a period excluding a period in which the intake valve is open.

(6) Similarly to the concentration of HC emissions, a concentration of CO emissions (FIG. 11) was sharply increased when gasoline was injected while the intake valve was open. The concentration of CO emissions was maintained at a constant low level when gasoline was injected during a period excluding a period in which the intake valve is open.

The present invention is not limited to the specifically disclosed embodiments, and variations and modifications may be made without departing from the scope of the present invention.

What is claimed is:

1. A compression ignition type gasoline engine comprising:

a combustion chamber in which a mixture of air and gasoline is combusted by compression ignition;

an intake port communicating with said combustion chamber via an opening so that air is suctioned into the combustion chamber through the intake port and said opening, said opening being closed by an intake valve; and a fuel injection valve provided in said intake port so as to inject gasoline inside said intake port, said fuel injection valve injecting the gasoline within a duration in which said opening is substantially closed by said intake valve, said mixture being heated in the combustion chamber by a high compression ratio of the engine and the mixture is self-ignited only by heat generated by compression.

2. The compression ignition type gasoline engine as claimed in claim 1, wherein said compression ratio ranges from about 14 to about 20.

3. The compression ignition type gasoline engine as claimed in claim 1, wherein said compression ratio ranges from about 15 to about 19.

4. The compression ignition type gasoline engine as claimed in claim 1, wherein said compression ratio is substantially 17.5.

5. The compression ignition type gasoline engine as claimed in claim 1, wherein said duration is from substantially 10 degrees of crank angle before said opening is closed to substantially 110 degrees of crank angle before said opening is opened.

6. The compression ignition type gasoline engine as claimed in claim 1, wherein said combustion chamber is defined by a cylinder, a cylinder head and a piston, said cylinder head having a substantially flat surface opposite to a top surface of said piston, said piston having a recess provided in said top surface which recess defines a part of said combustion chamber.

7. The compression ignition type gasoline engine as claimed in claim 6, wherein a diameter of said recess is more than one-half of an outer diameter of said piston, and a depth of said recess is less than one-third of said diameter of said recess.

8. The compression ignition type gasoline engine as claimed in claim 1, wherein said fuel injection valve injects the gasoline at a pressure ranging from about 0.15 MPa to about 1 MPa.

* * * * *